United States Patent
Bott et al.

(10) Patent No.: US 12,055,128 B2
(45) Date of Patent: Aug. 6, 2024

(54) OPTIMIZATION OF A WIND FARM

(71) Applicant: Wobben Properties GmbH, Aurich (DE)

(72) Inventors: Stefanie Bott, Aurich (DE); Arjun Brück, Bremen (DE)

(73) Assignee: Wobben Properties GmbH, Aurich (DE)

( * ) Notice: Subject to any disclaimer, the term of this patent is extended or adjusted under 35 U.S.C. 154(b) by 525 days.

(21) Appl. No.: 17/122,547

(22) Filed: Dec. 15, 2020

(65) Prior Publication Data

US 2021/0190040 A1 Jun. 24, 2021

(30) Foreign Application Priority Data

Dec. 20, 2019 (DE) .......................... 102019135582.6

(51) Int. Cl.
| | |
|---|---|
| *F03D 7/04* | (2006.01) |
| *F03D 7/02* | (2006.01) |
| *F03D 17/00* | (2016.01) |

(52) U.S. Cl.
CPC ........... *F03D 7/045* (2013.01); *F03D 7/0204* (2013.01); *F03D 7/022* (2013.01); *F03D 7/048* (2013.01);
(Continued)

(58) Field of Classification Search
CPC ........ F03D 7/045; F03D 7/0204; F03D 7/022; F03D 7/048; F03D 17/00; F05B 2260/84;
(Continued)

(56) References Cited

U.S. PATENT DOCUMENTS 10,738,763 B2 8/2020 Bode et al.
2013/0166082 A1* 6/2013 Ambekar ............. G05B 13/041
700/287

(Continued)

FOREIGN PATENT DOCUMENTS

CA 3053618 A1 9/2018
CN 106203695 A 12/2016
(Continued)

OTHER PUBLICATIONS

Grant Ingram, "Wind Turbine Blade Analysis using the Blade Element Momentum Method", Oct. 18, 2011, Creative Commons Attribution-ShareAlike 3.0 Unported License, Version 1.1 (Year: 2011).*

(Continued)

*Primary Examiner* — Christopher W Carter
(74) *Attorney, Agent, or Firm* — Seed IP Law Group LLP

(57) ABSTRACT

Provided is a method for optimizing an operation of a wind farm. The farm includes wind turbines and each can be adjusted via operating settings, and a farm model depicting the wind farm or part thereof is used. The method comprises an optimization sequence using the farm model, with the steps: specifying an optimization wind direction in the farm model for optimizing the operation of the farm for this wind direction; varying operating settings of at least a first leading turbine of the farm model; determining effects of varying the operating settings of the first leading turbine on at least one downstream turbine of the farm model, which is aerodynamically influenced by the first leading turbine, by means of a wake model; determining a total farm result of the farm model; wherein the operating settings are varied so as to optimize the total farm result.

12 Claims, 5 Drawing Sheets

(52) U.S. Cl.
CPC .......... *F03D 17/00* (2016.05); *F05B 2260/84* (2013.01); *F05B 2270/1033* (2013.01); *F05B 2270/20* (2013.01); *F05B 2270/204* (2020.08); *F05B 2270/404* (2013.01)

(58) Field of Classification Search
CPC .......... F05B 2270/1033; F05B 2270/20; F05B 2270/204; F05B 2270/404; Y02E 10/72; G06Q 50/06; G06Q 10/04; G06Q 10/067
See application file for complete search history.

(56) References Cited

U.S. PATENT DOCUMENTS

| | | | |
|---|---|---|---|
| 2015/0308416 A1* | 10/2015 | Ambekar | F03D 7/045 700/287 |
| 2017/0284368 A1* | 10/2017 | Franke | F03D 7/0292 |
| 2017/0370348 A1* | 12/2017 | Wilson | F03D 7/0224 |
| 2019/0120208 A1* | 4/2019 | Geisler | F03D 7/045 |

FOREIGN PATENT DOCUMENTS

| | | |
|---|---|---|
| DE | 102017105165 A1 | 9/2018 |
| EP | 2940296 A1 | 11/2015 |
| EP | 3376026 A1 | 9/2018 |
| EP | 3429050 B1 | 1/2019 |
| EP | 3536948 A1 | 9/2019 |

OTHER PUBLICATIONS

Heer et al., "Model Based Power Optimisation of Wind Farms," 2014 European Control Conference (ECC) Strasbourg, France, Jun. 24-27, 2014, pp. 1145-1150.

* cited by examiner

OPTIMIZATION OF A WIND FARM

BACKGROUND

Technical Field

The present invention concerns a method for optimizing an operation of a wind farm. The present invention also concerns a correspondingly optimized wind farm.

Description of the Related Art

There is a general desire to operate a wind farm that contains several wind turbines which feed into an electrical supply network, in particular via a common network connection point, as optimally as possible. In particular, the aim is to achieve as high a yield as possible, which usually means generating as much power as possible from the prevailing wind and feeding this power into the electrical supply network. Optimization of the wind farm may however also entail operating the wind farm or the individual wind turbines with the lowest possible stress. At least it should be operated such that any stress does not shorten the planned running period. For example, it may be provided to generate as much power as possible without overloading the wind turbines of the wind farm.

An optimum yield, in particular an optimum power generation from the wind, may be achieved in particular in that each wind turbine is designed optimally in order to operate each wind turbine accordingly in an operating mode which is as optimal as possible.

Such optimization of the wind turbine may in particular mean that an adapted rotation speed-power curve for the wind turbine is determined. Instead of a rotation speed-power curve, a rotation speed-torque curve may also be used. On operation with a rotation speed-power curve, in ongoing operation when the wind turbine is operated in the partial load region, a rotation speed is set which is dependent on the actual power output. This allocation of the rotation speed to be applied to the actual power output is predefined by the rotation speed-power curve. The rotation speed of the wind turbine is thus adjusted depending on the wind speed. In this way in particular, it may be ensured that the wind turbine runs with the most optimal tip speed ratio possible.

Such or other optimum settings of the wind turbine may be made in advance, i.e., before commissioning or even before erection of the wind turbine, by corresponding simulation. Such a simulation is based on a precise model of the wind turbine. Further environmental conditions such as environmental topology may have an influence. In particular, information on the prevailing wind profile at the erection site may exert an influence. Before erection and/or commissioning of the wind turbines, therefore, a corresponding measurement mast may be erected at the erection site and/or in the vicinity of the erection site.

It has however now been found that the mutual aerodynamic influences of the wind turbines of a wind farm may be so great that they cannot be ignored. It is no longer sufficient to consider and optimize a single wind turbine. Rather, depending on wind direction, the operating setting of the one wind turbine may affect the yield of another wind turbine, in particular may significantly reduce this. If this one wind turbine is optimized but the yield of another wind turbine is greatly reduced, this may mean that optimization of the one wind turbine leads as a whole to a reduction in the yield of the wind farm, because the yield of both wind turbines affects the yield of the wind farm.

It would therefore be desirable to take account of the wind farm or its yield as a whole, and in particular for the operating settings of each individual wind turbine, to consider the operating settings of further wind turbines insofar as these wind turbines could potentially exert a mutual influence.

Ideally, all wind turbines of the wind farm will then be optimized together. Such a common optimization is however complex and there may not be sufficient information available for such an extensive optimization.

BRIEF SUMMARY

Herein, the operating settings of wind turbines are adapted so as to be optimal for the wind farm as a whole, in particular since the maximum yield is thereby achieved for the wind farm.

A method is provided. This method for optimizing an operation of a wind farm is therefore based on a wind farm comprising several wind turbines, wherein each wind turbine can be adjusted via its operating settings. To optimize the wind farm, a farm model is used. This farm model depicts the wind farm, at least part thereof. The wind farm model is thus a model which also considers and depicts mutual influences, in particular of aerodynamic nature, of the wind turbines. The farm model, which is synonymously also called the wind farm model, may be established by measurements of the wind farm or by analytical calculations based on the erected wind turbines or those to be erected, including the position of these wind turbines within the wind farm or planned wind farm. Topographical circumstances, such as the topology of the territory or vegetation in the region of the wind farm, may also influence the farm model in some cases.

The proposed method comprises an optimization sequence using the farm model, and for this the following steps are proposed.

Firstly, in the farm model, an optimization wind direction is specified, which may also be defined as the wind direction distribution in which the fundamental wind direction may fluctuate around the optimization wind direction, in order to optimize the operation of the wind farm for this wind direction. Accordingly, the optimization sequence may be repeated for further wind directions. Taking account of the wind direction is particularly relevant for considering wake effects, i.e., aerodynamic effects of a leading wind turbine on a downstream wind turbine standing behind this in the wind direction. Also however, the topography of the site may mean that different wind directions lead to different behaviors of the wind turbines.

In a variation step, then the operating settings of at least a first leading wind turbine of the farm model are varied. Depending on wind direction, a wind turbine may be described as a leading wind turbine and studied as such. This may also be redefined for a new wind direction. From this first wind turbine, in particular an azimuth angle, i.e., the orientation of the wind turbine and together therewith a power output of the wind turbine may be varied. Also, variation of the rotation speed and/or pitch angle of the rotor blades may be considered additionally or alternatively. All this takes place in the farm model containing these wind turbines or containing these wind turbines as models.

In a wake determination step, the effects of varying the operating settings on at least one downstream wind turbine, which is aerodynamically influenced by the first leading wind turbine, are determined by means of at least one wake model. Such a wake model models the influence of the wind in the wake of said first leading wind turbine. To express this visually, such a wake model models or takes account of a wind drag or turbulence caused by the first wind turbine, in particular how this affects a wind turbine situated to the rear in the wind direction. In particular, it can be assumed that, by its rotation and its rotor blades, the wind turbine generates a helical drag or eddy zone behind it. This reaches at least the one wind turbine aerodynamically affected by this first wind turbine, and the wake model takes account of these effects on the influenced wind turbine.

Slightly less evidently, in particular a speed deficit and an induced turbulence are considered. The speed deficit is the reduction in wind speed caused by the leading wind turbine, and the induced turbulence describes turbulence caused by the leading wind turbine. Induced turbulence may synonymously also be described as induced turbulence intensity or increased turbulence intensity.

In a total determination step, then a total farm result is determined, in particular a potential total farm power of the wind farm of the farm model. Here, further wind turbines contained in the farm model may also be taken into account. In other words, the farm model contains all wind turbines to be studied, and calculates or models how much power each of these wind turbines produces for the respective set wind direction and wind speed; these power levels are then added together and described as the potential total farm power of the wind farm. This calculation takes account of how the operating settings of said first leading wind turbine aerodynamically influence, in particular adversely affect, the at least one wind turbine influenced thereby.

It is proposed here that the operating settings are varied so as to optimize the total farm result, insofar as it can be changed by the operating settings. In particular, this takes place such that the total farm power is maximized. The operating settings thus found are stored as optimized operating settings of the respective wind turbine. This may take place in the wind turbine or at a central location. When optimized by means of the farm model, the operating settings are stored in the farm model.

In a first step, the method initially works such that the operating settings of the first leading wind turbine are varied. The resulting changing power output of this first leading wind turbine is then taken into account, together with an effect on at least one downstream wind turbine. The power output by this at least one downstream wind turbine, which is namely influenced by the first leading wind turbine, is also determined in the model. Changing the operating settings of the first leading wind turbine may for example lead to a reduction in its power output, while simultaneously leading to an increase in the power output of said downstream wind turbine. Also, the influence on yet further wind turbines in the wind farm may be considered; in a simple consideration however, initially at least illustratively, it may be assumed that only these two wind turbines are affected by the variation of operating settings of the first wind turbine. Then the sum of the two power levels can be seen in the resulting total wind power, which should be higher after optimization.

Therefore if the variation in operating settings of the first leading wind turbine leads to a power reduction which is smaller than the resulting power increase of the downstream wind turbine, the resulting total farm power is increased. If however the power of the first leading wind turbine is reduced by the variation more greatly than the increase in power of the downstream wind turbine, the total farm power is reduced and the associated variation was not optimal. The proposed optimization thus in particular concerns the case that the variation leads to a reduction in the power output of the first leading wind turbine, and it is then a question of whether or not also the power of the further downstream wind turbine influenced thereby is increased so greatly as to compensate for the power reduction of the first leading wind turbine.

In this way, in this first run-through, an optimized operating setting of the first leading wind turbine may be found which can be stored as the optimized operating setting.

Thus in the farm model, operating adjustments may be made to the first wind turbine situated upwind and their effects on further wind turbines situated downwind may taken into account via the wake model. If the total farm result is the total farm power of the wind farm, the sum of the power levels of all wind turbines in the wind farm are taken into account. In this way, the power levels of the at least one first leading wind turbine and the at least one downstream wind turbine are considered.

In particular, use of the wake model allows consideration of the aerodynamic influence of the first wind turbine situated upwind on the further wind turbine situated downwind. Despite this however, finally the total farm result and in particular the total farm power is considered as an evaluation criterion.

Instead of considering the total farm power as the total farm result, it is also possible to consider a loading on the wind farm, i.e., in particular on the individual wind turbines of the wind farm. For example, the loading may be considered via a quality function, which could for example relate to a reduction in service life to be expected because of the loading. The loading and the farm power may then be considered jointly via corresponding weighting.

Preferably, it is proposed that the optimization sequence is repeated while the optimization wind direction is retained. For this, operating settings of at least one further leading wind turbine of the farm model are varied, and the effects of varying the operating settings of the at least one further leading wind turbine on at least one further downstream wind turbine, which is aerodynamically influenced by the further leading wind turbine, are determined by means of a further wake model. In particular, the effects on further, in particular all wind turbines in the wake of the at least one further leading wind turbine are determined. The wake model may be the same as that used for the first leading wind turbine and the first downstream wind turbine, but with adapted parameters. The further leading wind turbine may be a wind turbine adjacent to the first leading wind turbine. It may also be the downstream wind turbine of the first leading wind turbine, i.e., the downstream wind turbine in the first run-through of the optimization sequence.

It is furthermore proposed that the operating settings of the at least one first leading wind turbine remain unchanged. In particular, it is proposed that none of the at least one first leading wind turbine for the optimization wind direction is aerodynamically influenced by one of the at least one further downstream wind turbines. In particular, it is proposed that in the first run-through of the optimization sequence, a wind turbine which is not influenced by any wind turbines of the wind farm in the predefined optimization wind direction is selected as the first leading wind turbine. For this, the first optimization sequence is then carried out and the operating settings of this first leading wind turbine are found.

In the first repeat of the optimization sequence, a further wind turbine is selected which thus accordingly, in this repeat, forms the new first leading wind turbine. It may or may not depend on the original first leading wind turbine according to the first optimization sequence. In this way, the optimization sequence is repeated in that, always for the same optimization wind direction, a further wind turbine forms the new first leading wind turbine. The respective new first leading wind turbine has no influence on the former first leading wind turbines, i.e., on the first leading wind turbines of the previous run-throughs of the optimization sequence.

In other words, the method progresses gradually from one optimization to the next in the optimization sequence, from the front wind turbines to the rear wind turbines. The operating settings of each front wind turbine, which were already varied in an optimization sequence and hence substantially optimized, remain unchanged in the further repeats of the optimization sequences. Thus the operating settings of the wind turbines may be optimized from front to back with respect to the optimization wind direction. Here, a downstream wind turbine in at least one optimization sequence may form a leading wind turbine in a later repeat of the optimization sequence.

Thus it is proposed to repeat the optimization sequence multiple times, wherein the operating settings of ever more leading wind turbines, whose operating settings have already been varied, remain unchanged. Preferably, an optimization sequence may be omitted for downstream wind turbines which themselves influence no further wind turbines, such that these wind turbines are simply operated according to their optimal operating settings which were optimized without taking account of the wind farm. For this for example, an operating parameter set may be used which was calculated in advance during the design of the wind turbine.

To this extent, a leading wind turbine generally designates a wind turbine which aerodynamically influences a further wind turbine. This aerodynamically influenced wind turbine is called the downstream wind turbine, and the designations as a leading wind turbine and as a downstream wind turbine are temporary designations which are assigned to a wind direction, namely in particular the optimization wind direction. Thus the terms "leading wind turbine" and "downstream wind turbine" are defined particularly for the case that the aerodynamic influence of the leading wind turbine on the downstream wind turbine is calculated by means of a wake model.

According to one embodiment, it is proposed that for the optimization sequence, an optimization wind speed is predefined, and the optimized operating settings are stored together with the optimization wind direction and the optimization wind speed. In operation of the wind farm, the operating settings can then be selected depending on the actual wind speed and wind direction. For this, as proposed in one embodiment, it is possible to store the respective operating settings together with the optimization wind speed and optimization wind direction for each wind turbine in the respective wind turbine. Each wind turbine then has a dataset with wind speeds and wind directions and the assigned operating settings.

Optionally or additionally, it is proposed that for each wind direction, an operating curve is produced. Such an operating curve may be a rotation speed-power curve or a rotation speed-torque curve, to name the two most common examples. Such an operating curve may then be selected for each wind turbine and wind direction. The operating curve takes account of different wind speeds which are in particular reflected in the allocation between rotation speed and power, or between rotation speed and torque.

In particular, it is proposed that the optimization sequence for an optimization wind direction is performed for all wind turbines of the wind farm which must be optimized, i.e., repeated for each wind turbine. In each optimization sequence or repeat of the method as a whole, in addition the wind speed may be varied and the respective results stored depending on the respective wind speed and naturally the optimization wind direction.

It is furthermore proposed that the method as a whole is repeated several times, namely for various optimization wind directions. For example, the optimization wind direction may be gradually adapted in 1° steps or 5° steps from 0° to 360° (or from 1° or 5° to 360°) in order to carry out the respective optimization process. Preferably, verification of all these wind directions as a respective optimization wind direction, may be interpreted or described as a whole as the optimization method.

According to one embodiment, it is proposed that as the operating settings to be varied, one, several or all of the following operating settings are used.

As an operating setting, a rotation speed of an aerodynamic rotor of the wind turbine may be used. In particular, this rotation speed also influences the aerodynamic effects on the respective downstream wind turbine.

As an operating setting, a blade angle of at least one rotor blade of the rotor of the respective wind turbine may be used. The blade angle also affects the operation of the wind turbine and influences the wake effects of the wind turbine, and hence influences the wind conditions on the downstream wind turbine.

As an operating setting, an azimuth orientation of the nacelle of the wind turbine may be used. In principle, the azimuth orientation of the nacelle of the wind turbine should be set to the wind direction, i.e., as far as possible, the nacelle should be oriented in the wind direction, but slight deviations of for example 5° to 15° may occur. Such deviations from the optimal setting for the individual wind turbine may also influence the direction of the turbulence in the wake of the wind turbine, so that in some cases it may be achieved that the turbulence from this leading wind turbine then no longer reaches the downstream wind turbine or is at least significantly weaker in effect. Thus a slight change in azimuth orientation of the leading wind turbine may have a great effect on the downstream wind turbine. This effect also applies to the wind speed which is reduced in the wake.

Together with the setting of the rotation speed, blade angle and/or azimuth orientation, a power output of the wind turbine and hence of the generator may be changed and adjusted. Also or alternatively, with the change in rotation speed, blade angle and/or azimuth orientation, the torque of the generator may be set and adapted.

According to one embodiment, it is proposed that operating settings of several leading wind turbines are varied at the same time, wherein for each of these leading wind turbines, effects of varying the operating settings on a respective at least one downstream wind turbine, which is aerodynamically influenced by the leading wind turbine, are calculated by means of a wake model. The leading wind turbines thus each form a first wind turbine or first leading wind turbine. At least one downstream wind turbine is assigned to each leading wind turbine. Thus in principle, several pairs of wind turbines are created with a leading wind turbine and a downstream wind turbine. For each of these pairs, a wake model is applied in order to determine the influence of the leading wind turbine of the pair on the downstream wind turbine. This consideration of the wind turbine pairs serves merely to illustrate how several leading wind turbines may be varied together. A leading wind turbine may however also influence several downstream wind turbines. A new allocation takes place on a new run-through and/or a new optimization wind direction.

In particular, this is based on the knowledge that a wind farm has so many wind turbines that these may be arranged in several rows, even if the rows are not necessarily designated as such. If the wind is blowing for example from the west and several wind turbines stand on a westerly edge of the wind farm, these could effectively simultaneously be considered the first leading wind turbines.

With simultaneous variation of the operating settings of several leading wind turbines, the method may proceed such that initially the operating settings of one of these leading wind turbines are varied. In this way for example, a total farm result, in particular a total farm power, may be provisionally optimized. Thus for example, on variation of the first leading wind turbine, a maximum total farm power may be sought. When such a provisional maximum has been found, the operating settings of the next of these first leading wind turbines may be varied in the same way until a new provisional maximum is found. This must then lie above the first provisional maximum, but may also be the same if the maximum was already present. In this way, the method may successively vary the operating settings of the further first leading wind turbines.

This is based in particular on the knowledge that in each case, influencing always occurs only between wind turbines of a wind turbine pair or a wind turbine group. These pairs of wind turbines, which namely each comprise a leading wind turbine and a downstream wind turbine—or in the case of a wind turbine group, several leading wind turbines and/or several downstream wind turbines—are in principle decoupled from each other. The variation of the leading wind turbine of the pair thus influences only the downstream wind turbine of the same pair, but not a downstream wind turbine of another pair or another group.

When in this way optimum operating settings have been found for all leading wind turbines which were varied in this first optimization sequence, the optimization sequence may be repeated with new leading wind turbines. In this repeat, for example, the wind turbines of the second row viewed in the wind direction may be varied and their operating settings changed.

Thus the settings of the wind turbines of one row after the next may be optimized.

Preferably, the wake model determines an induced turbulence. A wake model is thus selected which can take account of such induced turbulence. Such induced turbulence is a very relevant aerodynamic influencing variable, and it has been found that taking this into account in the wake model can therefore lead to a correspondingly good result.

In particular, by considering the induced turbulence, not only the effect on the generated power of the wind farm, but also the effect and in particular the loading on the respective wind turbines, in particular their rotor blades, can be taken into account. Consideration of the induced turbulence goes to this extent beyond pure consideration of the power and supplies a more precise assessment.

Preferably, the wake model takes account of a speed deficit which describes or defines a reduction in wind speed in the wake of the wind turbine.

According to one embodiment, it is proposed that a total farm power, taking into account a maximum mechanical load on the wind turbines, is used as a total farm result. In this way, consideration of the total farm power, which may also be called the farm power, takes priority for optimization, and the mechanical load on the wind turbines may be considered as a secondary condition. For example, a leading wind turbine may heavily load a downstream wind turbine because of induced turbulence. If the rotation speed of the leading wind turbine is reduced, a reduction in power may take place. If the power of the downstream wind turbine is thereby increased, but to a lesser extent than the reduction in power of the leading wind turbine, the reduction in rotation speed of the leading wind turbine will be undesirable. If however it is additionally considered that the mechanical loading falls significantly, the power loss may be acceptable, in particular if the power loss is slight.

According to one embodiment, it is proposed that for a respective optimization wind direction, the wind turbines of the wind farm are sorted into a processing order, and the optimization sequence is run repeatedly so that on each run, at least one of the variation step, the wake determination step and the total determination step are run. It is proposed here that in the variation step, in each run-through, the operating settings of the respective at least one wind turbine are varied according to the processing order, so that the first wind turbine whose operating settings are varied in the first run-through corresponds to the first wind turbine of the processing order, and further wind turbines whose operating settings are varied in further run-throughs correspond to the further wind turbines of the processing order. The processing order thus designates the order of the leading wind turbines to be varied. The order depends on the optimization wind direction.

In particular, it is proposed that the processing order depends on the site coordinates of the wind turbine in the wind farm and the optimization wind direction.

It is thus proposed that, depending on optimization wind direction, the wind turbines of the wind farm are sorted into an order and the optimization performed according to this order. In principle here, however, also several wind turbines—i.e., for example a row of wind turbines—may be provided in a common position in the processing order, or characterized in the processing order, if several wind turbines standing behind one another in the processing order can be considered in the same optimization sequence as leading wind turbines. Whether or not the operating settings of several wind turbines are varied in a run-through of the optimization sequence, before the optimization sequence is repeated, also depends on the wind direction, i.e., the respective selected optimization wind direction. In particular, whether several wind turbines are actually arranged in a row pointing into wind or whether there is no such row for a specific wind direction, may depend on the wind direction.

In particular, the processing order depends on the site coordinates of the wind turbine in the wind farm and on the optimization wind direction. In particular, the position of each wind turbine with respect to the other or at least the adjacent wind turbines is taken into account for establishing the processing order. Preferably, such a processing order is stored depending on the optimization wind direction, and reused if the optimization process is to be repeated at a later time.

According to an embodiment, it is proposed that in the farm model, for a respective leading wind turbine, an azimuth angle, a blade angle and/or a rotor rotation speed are set as adjustment values on the leading wind turbine; a wind speed and a turbulence are defined or determined as flow conditions; depending on the adjustment values and flow conditions, by means of a blade element method, a coefficient of thrust acting on the leading wind turbine is determined, and an installation power of the leading wind turbine is determined, and depending on the coefficient of thrust and the turbulence of the leading wind turbine, an induced turbulence and a speed deficit of a downstream wind turbine are determined. In particular, from the speed deficit, a wind speed acting on or relevant for the downstream turbine can be determined.

For the leading wind turbine therefore, the flow conditions must be predefined. For the next wind turbine, the method can proceed as follows:

The predefined flow conditions and adjustment values, in particular the azimuth angle, blade angle and rotor rotation speed, are used as input variables for the blade element method (BEM). This calculates the thrust and power at the leading wind turbine. The flow conditions on the downstream wind turbine are determined by the predefined flow conditions and thrust coefficient of the leading wind turbine. Then, iteratively, the same process is carried out for a further downstream wind turbine. Thus a blade element method (BEM) is carried out with the flow conditions at the downstream wind turbine and the adjustment values of this wind turbine.

The leading wind turbine may be the first turbine in an optimization sequence or a later one. Insofar as the leading wind turbine is one which itself is not influenced by any wind turbine, the predefined optimization wind speed is used as the wind speed. In other cases, a wind speed is calculated which depends on the optimization wind speed. The first wind turbine considered in the method may be one which results from sorting, wherein sorting takes place as a function of wind direction, in particular in the wind direction. The first wind turbine, i.e., that considered first, is in particular a leading wind turbine which itself is not influenced by any wind turbine. This also means that the sort order changes for a new wind direction.

If the leading wind turbine is one which itself is not influenced by any other wind turbine, an ambient turbulence is taken as the turbulence. Such an ambient turbulence may depend on the wind direction, i.e., the optimization wind direction, and on the wind speed, i.e., the optimization wind speed. This dependency may be established by corresponding measurement of the erection site at which the wind farm is to be installed or at which an existing wind farm is to be improved. Otherwise, i.e., if the leading wind turbine is one which is influenced by a wind turbine, a turbulence is calculated which depends in particular on the ambient turbulence. Calculation takes place using wake models.

The wind speed and turbulence thus form the flow conditions for the wind turbine concerned.

Usually, the azimuth angle, blade angle and rotor rotation speed are set at the leading wind turbine and described as the adjustment values, and these adjustment values are used for the further simulation or calculation. Instead of the rotor rotation speed, a torque or power may be predefined from which a rotor rotation speed may be determined.

Using a blade element method, from the flow conditions and adjustment values, i.e., in particular all adjustment values, a coefficient of thrust and an installation power for the leading wind turbine concerned are determined. The installation power is required, in combination with the other installation powers of the wind farm, in order to determine the total farm power.

The coefficient of thrust is required to determine the wind speed and turbulence which act on a downstream wind turbine. For this, a wake model is used. Such a wake model is known in principle and for example the model from NO Jensen or the Qian model may be used.

From the coefficient of thrust and further information, a load on the wind turbine concerned can also be determined.

Accordingly, depending on the coefficient of thrust and the turbulence of the leading wind turbine, an induced turbulence and a speed deficit of a downstream wind turbine may be determined, wherein these variables act on the downstream wind turbine.

The induced turbulence is thus the turbulence acting on the downstream wind turbine. The speed deficit "d" may designate the difference between the wind speed of the leading wind turbine "v_inf" and the wind speed of the downstream wind turbine "v_wake". The following equation then applies: v_wake=v_inf−d (depending on the sign of "d", the equation may also be v_wake=v_inf+d). Instead of a difference, other conversions could be considered. For example, the wind speed deficit may indicate a percentage reduction in wind speed of the leading wind turbine, so that the wind speed is lower by this percentage value than the wind speed of the leading wind turbine.

Preferably, the method is characterized in that on the downstream wind turbine, an azimuth angle, a blade angle and/or a rotor rotation speed are set as adjustment values; depending on the adjustment values of the downstream wind turbine, the induced turbulence and the speed deficit, by means of a blade element method a coefficient of thrust acting on the downstream wind turbine is determined, and an installation power of the downstream wind turbine is determined.

The coefficient of thrust acting on the downstream wind turbine and its installation power are thus determined in the same way as the values of the leading wind turbine, wherein the flow conditions are the speed deficit or a wind speed determined therefrom which acts on the downstream wind turbine, and the induced turbulence. The coefficient of thrust is used to calculate an induced turbulence and a speed deficit for yet a further downstream wind turbine.

According to one embodiment, it is proposed that flow conditions are determined depending on further environmental conditions, in particular shear, veer and/or air density. It is thus proposed that these environmental conditions, or one or some thereof, are included in the simulation. These may be taken into account in a blade element method. It is an advantage of the blade element method that such a consideration is possible. In particular, the air density is considered in the blade element method.

Here it was found in particular that the turbulence of the leading wind turbine and the coefficient of thrust are of great relevance for calculating the wake acting on at least one downstream wind turbine. The wake may preferably also be determined for a second or third downstream wind turbine, in particular also if this second or further downstream wind turbines are themselves arranged behind the first downstream wind turbine. Preferably, in calculation of the wake, a distance from a downstream wind turbine is taken into account.

Accordingly, on a repeat of the optimization sequence, a new leading wind turbine may be used and on this basis the wake on at least one further downstream wind turbine determined.

The wake here is in particular the change in wind flow resulting from the leading wind turbine for the at least one downstream wind turbine, in particular the resulting speed deficit and the induced turbulence.

According to a further embodiment, it is proposed that in a total run-through, the optimization sequence is repeated for several wind turbines until operating settings found for all leading wind turbines of the wind farm are stored as optimized operating settings. In particular, the optimization is performed until the operating settings no longer change substantially. Such a total run-through is thus a run-through in which the optimization sequence is repeated for several wind turbines. Each time, at least one wind turbine is selected as the leading wind turbine and its operating settings optimized such that the total farm result is optimized. In other words, after a total run-through, the optimization of all wind turbines of the wind farm is in principle completed.

It has however been found that, in the optimization of the operating settings of a leading wind turbine, in particular the first leading wind turbine, operating settings of the other wind turbines—or at least some of the other wind turbines—are later changed. The operating settings which are assumed to be optimized of said leading wind turbine, i.e., in particular the first leading wind turbine, may thus possibly no longer be optimal since they are not optimally matched to the modified operating settings of some or all other wind turbines.

It is therefore proposed that such a total run-through is repeated once or several times. In this way, the operating settings can still be slightly improved and the total farm result also slightly improved. It has however been found that such improvements are comparatively slight, so that few repeats of the total run-through, i.e., few total runs, are normally sufficient. In particular, it is proposed that a total run is performed twice, three times, four times or five times for one optimization wind direction.

Preferably, it is proposed that the total farm result, in particular the total farm power achieved at the end of a total run-through, is compared with the total farm result or total farm power of the next optimization run in order to determine and evaluate the improvement in the total farm result or total farm power. Preferably, depending on the established improvement of the total farm result, a further total run is then performed, and/or depending on the improvement of the total farm result or total farm power from one total run to the next total run, a further total run is performed or not performed.

A wind farm is also proposed. Such a wind farm comprises several wind turbines which are each adjustable via operating settings. Also, a farm model is present depicting a wind farm or part thereof, via which the operating settings of the wind farm are optimized. The wind turbine was thus optimized via this farm model. For this it is proposed that for optimization, a model according to a least one of the above-mentioned embodiments is used.

Thus a wind farm is proposed which is optimized by the method described. The described method optimizes the wind farm as a whole and takes account of concrete aerodynamic influences of a leading wind turbine on a downstream wind turbine. Accordingly, this optimization is also reflected in the total behavior of the wind farm. In particular, it is evident in such a wind farm that individual wind turbines do not work optimally, in particular they generate less power than they could, while this is then only the case if at least one downstream wind turbine is present, i.e., a downstream wind turbine, which thereby generates a higher power, namely in particular at least as much higher as the power reduction of the preceding turbine, i.e., the leading wind turbine.

BRIEF DESCRIPTION OF THE SEVERAL VIEWS OF THE DRAWINGS

The invention is now described below as an example with respect to exemplary embodiments with reference to the accompanying figures.

DETAILED DESCRIPTION

Figure 1:
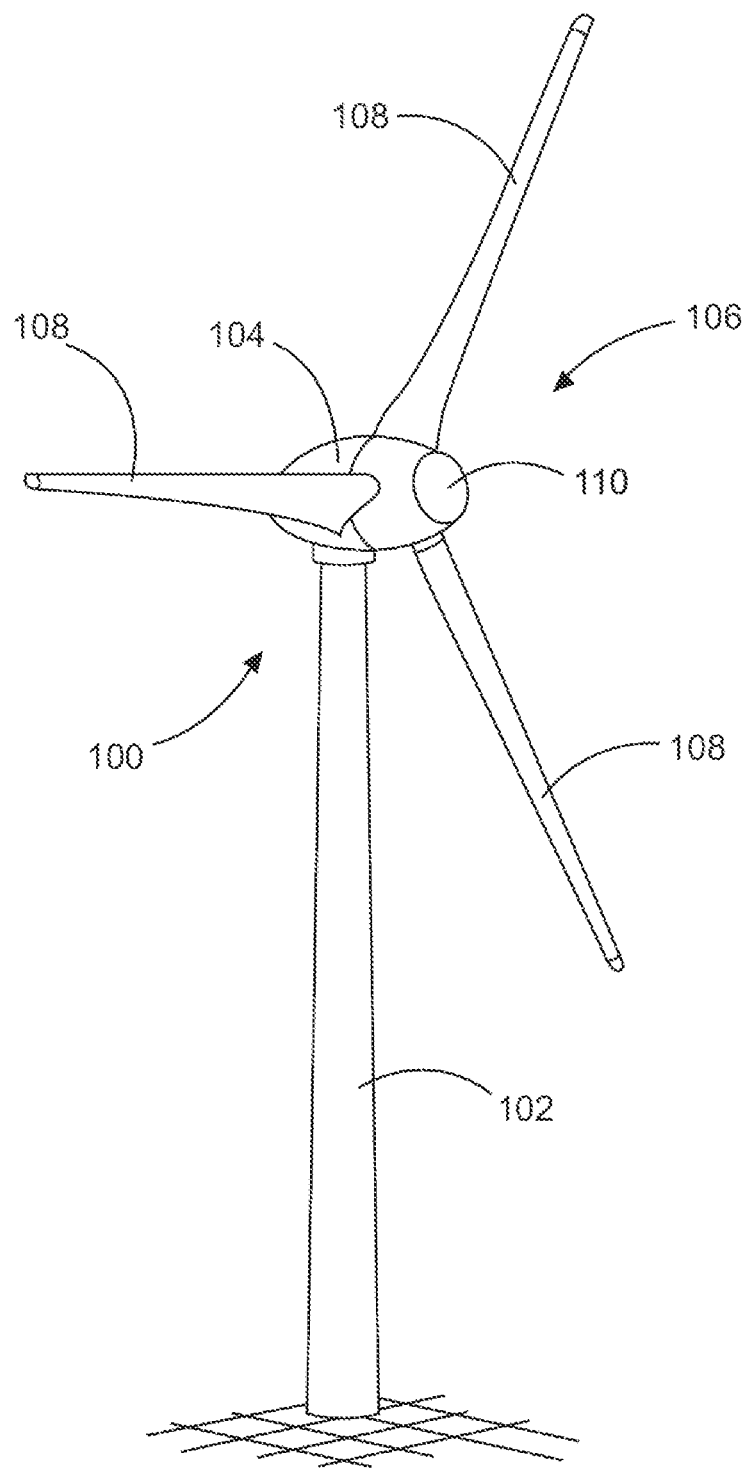
FIG. 1 shows a wind turbine in a perspective depiction.

FIG. 1 shows a wind turbine 100 with a tower 102 and a nacelle 104. A rotor 106 with three rotor blades 108 and a spinner 110 is arranged on the nacelle 104. The rotor 106 is set in a rotary motion by the wind during operation, and thereby drives a generator in the nacelle 104.

Figure 2:
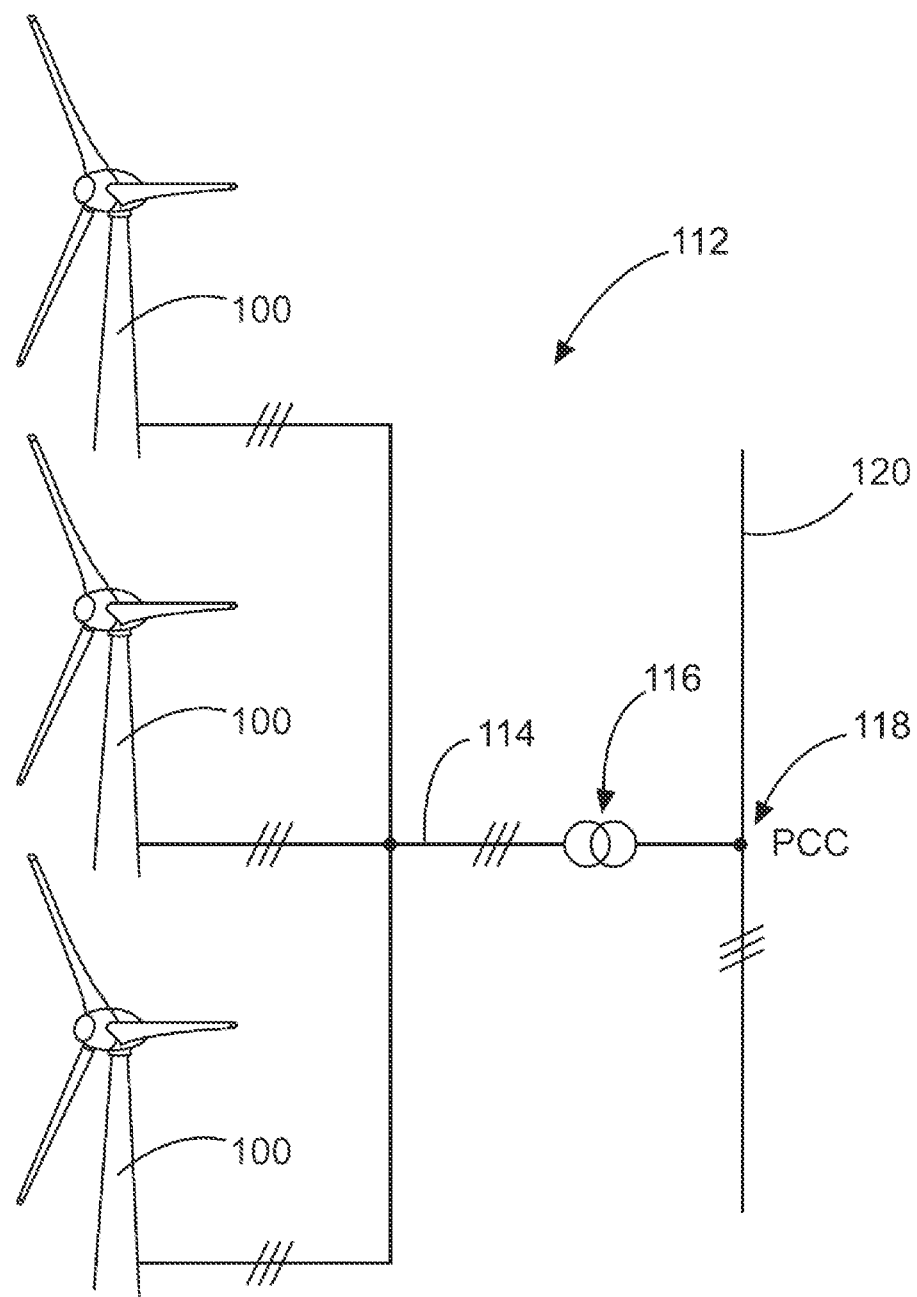
FIG. 2 shows a wind farm in a diagrammatic depiction.

FIG. 2 shows a wind farm 112 with as an example three wind turbines 100, which may be the same or different. The three wind turbines 100 thus represent in principle an arbitrary number of wind turbines of a wind farm 112. The wind turbines 100 provide their power, in particular the current generated, via an electric farm network 114. The currents or power generated by the individual wind turbines 100 are added together, and usually a transformer 116 is provided which steps up the voltage in the farm in order then to feed this into the supply network 120 at the infeed point 118, generally also known as the PCC. FIG. 2 shows only a simplified depiction of a wind farm 112, which for example shows no control system although naturally a control system is present. Also for example, the farm network for 114 may be constructed differently, in that for example a transformer is also present at the output from each wind turbine 100, to name just another exemplary embodiment.

Figure 3:
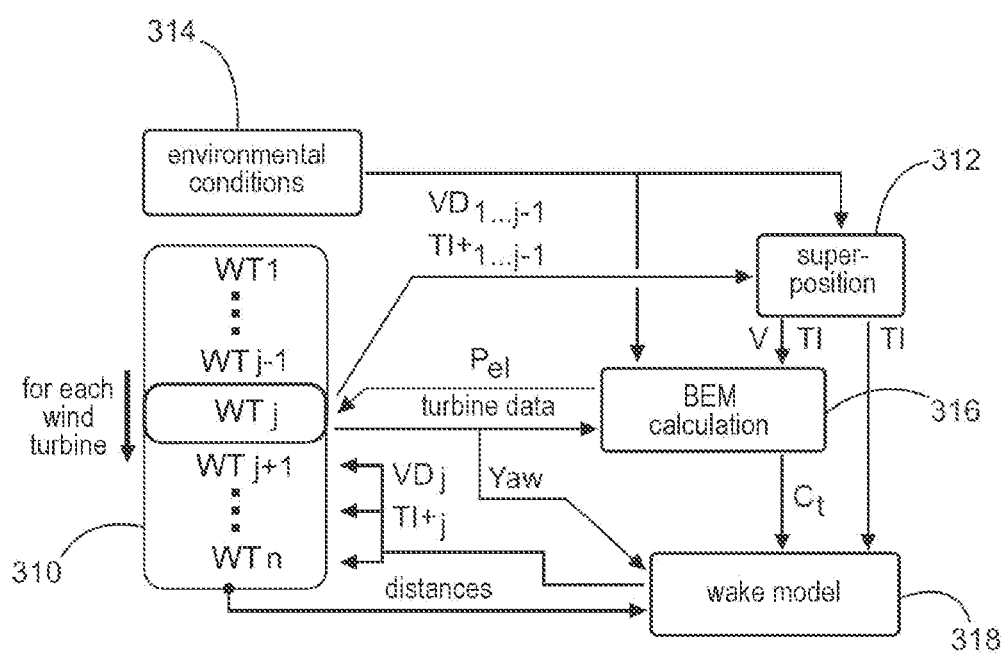
FIG. 3 shows a flow diagram for calculating a wind farm.

The diagram in FIG. 3 is generally based on the assumption that 1 to n wind turbines are present in a wind farm and should be calculated. A wind turbine is abbreviated here as WT and the index extends from 1 to n. Index j indicates the current wind turbine to be calculated or the associated parameters. Index j−1 therefore indicates the previously calculated wind turbine, and accordingly index j+1 indicates the next wind turbine to be calculated. The wind turbines are for this listed symbolically in the farm block 310 and the current wind turbine is marked WT j. A wind turbine may synonymously be described as a windmill or wind generator.

The method processes the wind turbines from the first wind turbine WT 1 to the last wind turbine WT n. The result amongst others is a speed deficit VD and an induced turbulence TI which act from the front wind turbines WT 1 to WT j−1 on the current wind turbine WT j. For the current wind turbine WT j, therefore the speed deficits $VD_{1 \ldots j-1}$ and the induced turbulences $TI+_{1 \ldots j-1}$ are taken into account and a superposition carried out in the superposition block 312. From an environmental condition block 314, the superposition block 312 receives corresponding environmental conditions. The wind speed may also be regarded as an environmental condition, wherein further environmental conditions include shear, i.e., a change in wind speed with location, in particular altitude, and veer, i.e., a change in wind direction with location, in particular altitude. The air density may be another environmental condition.

All this is taken into account or superposed in the superposition block 312.

The induced turbulence TI may also be designated the induced turbulence TI+. By superposition of all this information, in the superposition block 312, the total wind speed V acting on the current wind turbine WT j can then be determined, and also the total induced turbulence acting on the current wind turbine WT j. The two values form an input variable for a turbine calculation block 316. In the turbine calculation block 316, a blade element method is carried out to calculate the wind turbine, namely in particular to calculate the power $P_{el}$ which can be generated. For this, the blade element method, i.e., the turbine calculation block 316, also obtains the environmental conditions from the environmental condition block 314. Also, properties of the wind turbine WT j itself exert an influence, namely data such as properties of the wind turbine as such, i.e., in particular the rotor blades used, and the current operating settings of the wind turbine concerned.

On this basis then, using the blade element method, the turbine calculation block 316 calculates the electrical power $P_{el}$ of the current wind turbine. In this way, the current power $P_{el}$—which is also known or can be regarded as the output power—is calculated from the aerodynamic variables taking into account the wind farm, namely the wind turbines WT 1 to WT j−1 which potentially stand in front of the current wind turbine WT j. The power $P_{el}$ thus calculated may be fed back to the current wind turbine WT j as information. The wind turbine WT j concerned may store this data and make it retrievable if required.

Also, the effects of this current wind turbine WT j on the downstream wind turbines WT j+1 to WT n are calculated. For this, a wake model 318 is used. For this, the wake model 318 obtains the induced turbulence TI acting on the current wind turbine WT j, as calculated by the superposition block 312. The turbine calculation block 316, using the blade element method, also calculates a thrust coefficient $C_t$ which forms a further input variable for the wake model 318. The azimuth deflection or alignment of the wind turbine is also important for the wake model. This azimuth orientation can also be designated a yaw angle. This azimuth angle thus also forms an input variable for the wake model 318. Finally, the position and distance of the respective downstream wind turbines WT j+1 to WT n with respect to the current wind turbine WT j are important, and serve as an input variable for the wake model.

On the basis of these data, speed deficit $VD_j$ and the induced turbulence $TI_j$ on the downstream wind turbines WT j+1 to WT n are calculated. In this way, from earlier calculations, the current wind turbine WT j has also obtained the speed deficits $VD_{1\ \ldots\ j-1}$ and induced turbulences $TI_{1\ \ldots\ j-1}$ which are relevant for it, namely for the wind turbine WT 1 to WT j−1. So in this way, all wind turbines of the wind farm can be calculated.

Figure 4:
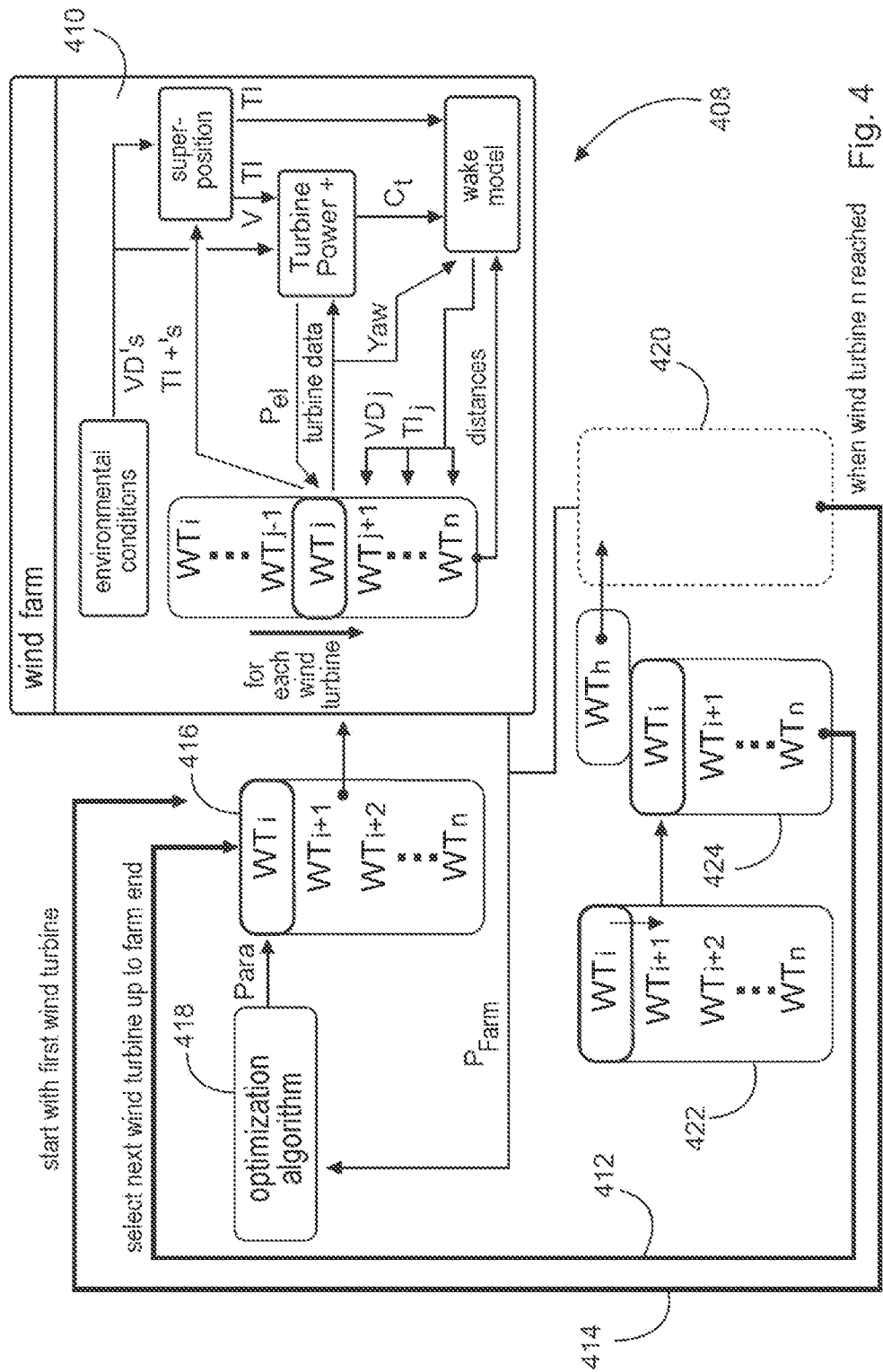
FIG. 4 shows a flow diagram for optimizing a wind farm.

FIG. 4 shows a flow diagram 408 which illustrates a farm optimization. For the farm optimization, a calculation must be repeatedly performed as explained in connection with FIG. 3. For this, the calculation block 410 is shown which in principle contains a sequence explained in FIG. 3. Accordingly, the flow diagram from FIG. 3 is contained as a symbolic miniature in the calculation block 410.

The flow diagram 408 illustrates in particular an inner loop 412 and an outer loop 414. In the inner loop 412, an optimization sequence is performed for several wind turbines, one after the other. When all wind turbines have been optimized in the repeated optimization sequence, a total run-through has been completed. With the outer loop 414, such a total run-through is repeated in order to improve the result already obtained in a first total run-through, or to establish that it can no longer be improved or no longer significantly further improved.

In the inner loop 412, optimization begins with the first wind turbine through to the last wind turbine n. The wind turbines WT 1 to WT n to be calculated are sorted into a processing order which depends on the wind direction. The processing block 416 illustrates this. In principle, the method begins with the first wind turbine, wherein for example this could also be the last, and in general the wind turbine WT i is then the current wind turbine being optimized. For this, an optimization algorithm illustrated by the optimization block 418 changes the current wind turbine WT i to be optimized. For this, the parameters of rotor rotation speed, blade angle and/or azimuth orientation are set or varied as operating settings, namely for the current wind turbine WT i to be optimized. With these adjusted parameters, then the calculation of the wind farm is carried out in the calculation block 410, i.e., carried out as described in connection with FIG. 3. The result is a total farm result, here output as the farm power $P_{Farm}$. Depending on this total farm result, the operating parameters can be changed further in the optimization block 418 until an optimum setting has been found for the parameters for this wind turbine, and hence optimum operating settings for the current wind turbine WT i have been found.

These may then be stored, as illustrated in the total evaluation block 420.

On the repeat of the inner loop 412, in the calculation in the calculation block 410, new calculation is required however only from the wind turbine i. All wind turbines upstream remain unchanged. This is indicated by the wind turbine WT h which can be shifted correspondingly to the total evaluation block 420, in which the wind turbines already fully optimized are stored.

When the operating settings of a wind turbine have been optimized, optimization is then performed for the next wind turbine, namely in particular for the wind turbine considered the next in the processing block 416.

Since in each case only the downstream wind turbines need be calculated, the list of wind turbines to be calculated in the calculation block 410 changes. To this extent, the number of turbines on a list forming the basis for this decreases on each iteration step of the inner loop 412. This is illustrated in FIG. 4 in that an old processing list 422 is changed to a new processing list 424. Accordingly, the new processing list 424 is shorter by at least one wind turbine than the old processing list 422. It should however also be considered that—as FIG. 4 does not show—several wind turbines may be optimized at the same time. In this case, it is also considered that the new processing list 424 may be reduced by more than one wind turbine in comparison with the old processing list 422.

When all wind turbines of the farm have been optimized, which is the case in particular when the inner loop 412 has been run n times, optimization in the first approximation is completed.

In order to check whether an adequate optimum has actually been found, the optimization according to the inner loop may be repeated. This is indicated by the outer loop 414. If the multiple run-throughs of the inner loop 412 are repeated, then on the first run of the inner loop this begins again with the first wind turbine, and all wind turbines are then recalculated as described above.

The result is again a farm power as a total farm result. This farm power of the second run of the outer loop may be compared with the farm power as the result of the first run of the outer loop. In this way, the outer loop 414 may be run several times, and the farm power recorded each time. Then from the recorded farm power levels for each run of the outer loop 414, it can be assessed whether the optimization was sufficient or should be repeated. When there is strong convergence of the farm power from one run of the outer loop 414 to the next, the calculation may be concluded.

The result is then an optimal setting of the wind farm for at least one wind direction and one wind speed.

The wind turbine h is the turbine whose settings have just been successfully optimized. It is therefore set aside, i.e., no longer changed, since its effects for this wind direction are now globally constant, i.e., assumed to be unchanged for all further calculations of the wind farm with the same optimization wind direction.

Figure 5:
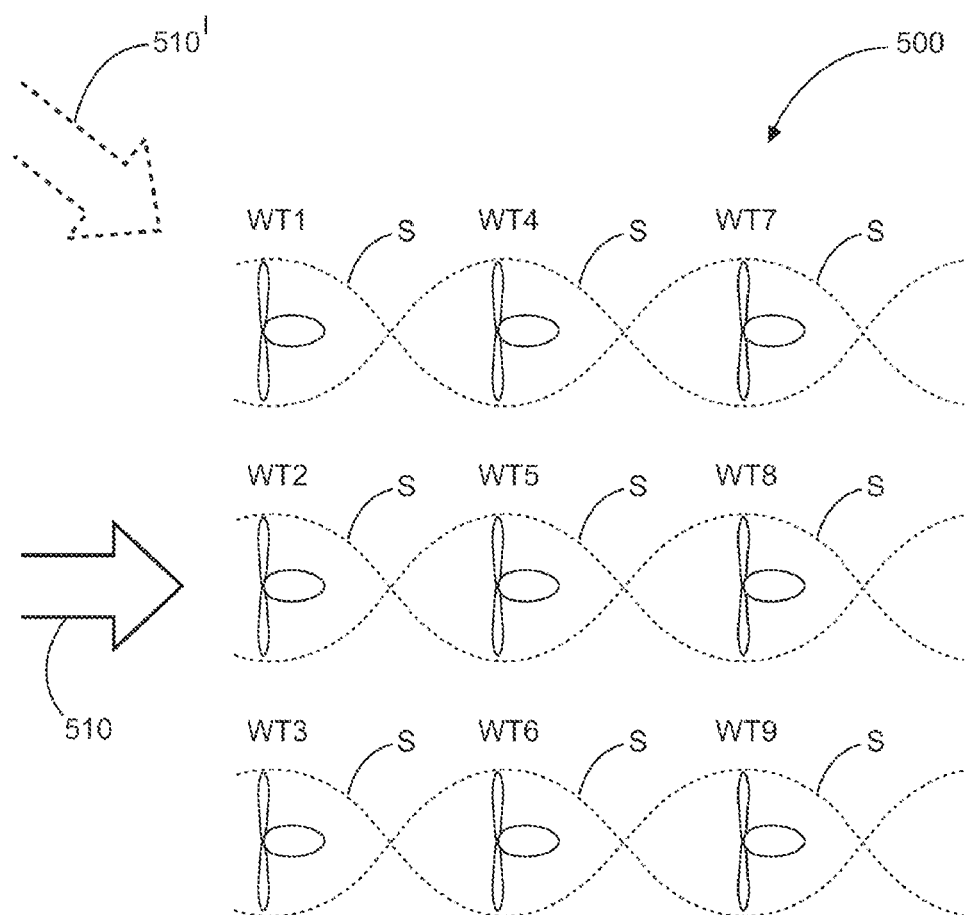
FIG. 5 shows a further diagrammatic depiction of a wind farm as explanation of a farm optimization.

FIG. 5 illustrates a wind farm 500 with nine wind turbines WT 1 to WT 9. The wind farm 500 may in principle correspond to the wind farm 112 from FIG. 2, which for reasons of clarity shows merely three wind turbines. The nine wind turbines WT 1 to WT 9 of FIG. 5 are shown illustratively. According to FIG. 5, a situation is depicted in which the wind 510 is in principle blowing from the left, as indicated by a large arrow. Accordingly, the azimuth settings of all wind turbines WT 1 to WT 9 are oriented to this wind. Each of the wind turbines WT 1 to WT 9 is depicted symbolically in a top view, with a nacelle and a rotor with two rotor blades standing horizontally in the illustration. In fact, the rotor turns naturally with these rotor blades, and also modern wind turbines today have three rotor blades instead of two.

Also, behind each wind turbine WT 1 to WT 9, a wind drag S is depicted symbolically in dotted lines for illustration. Such a wind drag has an approximately helical form. In fact, in the downwind region of each wind turbine, there is not only a clearly helical wind drag but generally turbulence occurs there, namely induced turbulence caused by the respective wind turbine. Also, there is a speed deficit, which in principle indicates that the wind speed is reduced by the wind turbine in front.

In the exemplary configuration of FIG. 5 therefore, the wind turbines WT 1 to WT 9 are optimized in this sequential order. In the first run of an optimization sequence, wind turbine WT 1 is regarded as the leading wind turbine. All following wind turbines WT 2 to WT 9 may be regarded as downstream wind turbines for this first optimization sequence. The wake of the first wind turbine WT 1 is however evidently of particular relevance only for the fourth wind turbine WT 4. Some effect would also occur for the seventh wind turbine WT 7.

In the case illustrated in FIG. 5, in which actually three wind turbines stand one behind the other in a row, it is also possible to optimize the first three wind turbines WT 1, WT 2 and WT 3 substantially simultaneously and consider the next three wind turbines WT 4, WT 5 and WT 6 as the downstream wind turbines. In particular wind turbines WT 1 and WT 4 may be considered as a wind turbine pair. The same applies to wind turbines WT 2 and WT 5, and also to wind turbines WT 3 and WT 6.

Thus in a first optimization sequence, the operating settings of wind turbines WT 1, WT 2 and WT 3 would be adjusted and their optimum found. In a second optimization sequence, the optimization settings of wind turbines WT 1, WT 2 and WT 3 would remain unchanged, namely at the values which resulted from the first optimization sequence.

In this second run-through of the optimization sequence, the wind turbines WT 4, WT 5 and WT 6 may each be regarded as leading wind turbines, and wind turbines WT 7, WT 8 and WT 9 as downstream wind turbines. In this second run-through of the optimization sequence, the operating settings of these three leading wind turbines WT 4, WT 5 and WT 6 may then be varied in order to find an optimum.

Finally, in a third optimization sequence or third run-through of the optimization sequence, the operating settings of wind turbines WT 7, WT 8 and WT 9 may be adjusted or set while the operating settings of the other wind turbines WT 1 to WT 6 remain unchanged. In this final run-through of the optimization sequence, there is no need to consider downstream wind turbines.

It is however also possible that the wind 510 flows onto the wind farm 500 turned through 30°. This is indicated as the second wind 510' with a dotted arrow. In this case, a joint assessment of the wind turbines WT 1, WT 2 and WT 3 as first leading wind turbines would no longer be possible, or only poorly possible. It may then be provided to optimize one wind turbine after the other. In this case too, wind turbine WT 1 may be considered the leading wind turbine and its operating settings optimized. The other wind turbines may be regarded as downstream wind turbines. The greatest effects may arise, with the wind direction of the second wind 510', from wind turbine WT 1 onto wind turbine WT 8. However, the first wind turbine WT 1 may be regarded as the first leading wind turbine and the other wind turbines as downstream wind turbines, wherein the calculation will show that perhaps only wind turbine WT 8 is significantly influenced.

In a second run-through, the operating settings of wind turbine WT 1 may remain unchanged because its operating settings have already been optimized, and wind turbine WT 2 may be considered as the next leading wind turbine.

In this way, all wind turbines WT 1 to WT 9 may be optimized, in this case in nine runs of an optimization sequence.

It is then still possible to repeat these nine runs of the optimization sequence, wherein the starting settings of all operating settings of wind turbines WT 1 to WT 9 are the settings found from the first nine runs of the optimization sequence.

As described herein configuring the operating method of individual wind turbines is no longer as per the prior art, wherein the individual turbine supplies the maximum possible yield, but such that the entire wind farm supplies an increased yield.

For this, a method is proposed for optimizing the operating settings such as pitch, rotation speed and yaw angle of wind turbines in wind farms as part of a cooperative strategy. Former known turbine control systems use a competitive strategy, in which each wind turbine uses settings which give the maximum power for the individual wind turbine instead of for the wind farm.

To determine optimal settings, various analytical wake models are combined with calculation by means of a blade element method, also known as a BEM calculation. In comparable known approaches, instead of the operating settings of the turbine, only auxiliary variables are used, such as the induction factor, which cannot be clearly assigned to a specific operating point. The results achieved there are purely theoretical nature.

By use of the BEM calculation, the actual operating settings may be used as optimization variables. The result is a significantly more precise prognosis of the achieved power of the individual wind turbine and also of the farm. Also, the effect of increased turbulence intensity on the wind turbines can be tested.

For the BEM calculation of a wind turbine, firstly the flow conditions for each wind turbine must be determined. The contact flow may be adversely affected by a wake. This concerns wind turbines erected upstream which stand in the wake of another wind turbine. This deterioration, which is perceptible by a reduction in wind speed and an increase in turbulence intensity, can be determined with analytical wake models such as NO Jensen or the Qian model. The preferred method proposed here uses the Qian model which offers the advantage of also taking into account the deflection of the wake by a deliberately incorrect setting of the yaw angle. The other models are also considered. Also, the increased turbulence intensity in the wake can be determined.

Preferably, it is proposed to take account of a superposition of the wakes of several wind turbines.

If a wind turbine 'j' stands in the wake of several upstream turbines i, the wakes are superposed. The resulting speed deficit is calculated with a superposition formula. Instead of the usual linear or quadratic summing of the speed deficits, here preferably the product formation of the residual speeds is proposed, which has proven to be plausible. For this, the following formula is proposed:

$$U_j = U_\infty \cdot \prod_{i=1}^{j-1} \left( \frac{U_{w,ij}}{U_i} \right)$$

In the formula, the variables have the following meaning:
$U_\infty$: undisrupted wind speed
$U_i$: disrupted wind speed at wind turbine 'i'
$U_j$: wind speed at wind turbine 'j'
$U_{w,ij}$: downstream speed caused by wind turbine i at position j, disregarding other wind turbines.

To calculate the values in a wind farm, a list of wind turbine objects is produced, i.e., a list of the wind turbines in the wind farm. From the coordinates and wind direction, the turbines are sorted by wind flow direction. Now the following procedure can be iterated or repeated for all n wind turbines with j=1 . . . n. This is illustrated in FIG. 3.

With reference to FIG. 3, the following steps are proposed:

Step 1: Use of speed deficits and induced turbulences from wakes of wind turbines 1 . . . j–1 on wind turbine j.

Step 2: From the induced turbulences, speed deficits and environmental conditions, by means of the selected superposition process, determination of the actual flow conditions for the wind turbine concerned, namely wind turbine j.

Step 3: Performance of a BEM calculation for wind turbine j with the flow conditions and operating settings of wind turbine j in order to determine the coefficient of thrust and the turbine power.

Step 4: From the coefficient of thrust, induced turbulence and set yaw angle, calculation of the wake effects of turbine j on turbines j+1 . . . n, and storage of the results in the corresponding wind turbines.

Step 5: Repetition of the sequence for the next turbine and all further turbines. In the first run-through, the influence of the first wind turbine on the second wind turbine and all further downstream wind turbines is determined. In the second run-through, the influence of the first and second wind turbines on the third and all further downstream wind turbines is determined. In the third run-through, the influence of the first three wind turbines on the fourth is determined, and so on up to the last wind turbine.

It is proposed that this procedure is applied in the flow direction, i.e., the wind direction, and hence the farm is completely calculated after a run-through which includes the repetitions for each wind turbine.

The sequence is shown in FIG. 3.

To optimize the operating settings, the following is proposed.

For each wind turbine, wind speed and wind direction, the rotation speed, blade pitch angle and yaw angle are available as optimization variables. For the entire wind farm, the number of variables is therefore equal to three times the number of wind turbines in the farm. These must also be varied with wind speed and wind direction.

The optimization is performed successively for wind turbines 1 to n as follows, wherein the current wind turbine is designated wind turbine i. For faster convergence, it is therefore proposed to optimize in an individual step only the settings of an individual wind turbine 'i' in a row of wind turbines. The target variable, i.e., the variable to be optimized, is the total farm power. The operating settings of the wind turbines situated downstream of 'i' are considered constant. The wind farm must only be recalculated from wind turbine 'i', and all upstream wind turbines remain unchanged. The input and output parameters are therefore also constant. The optimization problem can be described by the following equation.

$$\max_{s_i} P_{el,Farm} = P_{el,i}(U_i, TI_i, s_i) + \sum_{k=i+1}^{n} P_{el,j}(U_k, TI_k) + \sum_{h=0}^{i-1} P_{el,h}$$

$$\text{s.t. } TI_k \leq TI_{max}, \forall k \geq i+1, AoA^l(s_i) \leq AoA^l_{max} \forall l = 1, \ldots s.$$

In the formula, the variables have the following meaning:
h: running index over wind turbines upstream of 'i'
k: running index over all wind turbines downstream of 'i'
$s_i$: the operating settings of yaw and blade pitch angle and tip speed ratio at wind turbine 'i'
n: number of all wind turbines
$TI_k$: induced turbulence intensity in wake of wind turbine k
$U_k$: disrupted wind speed at wind turbine 'k'
$P_{el,x}$: electrical power of wind turbine x
$TI_{max}$: maximum turbulence intensity, see IEC standard 61400-1, ed 3
s: number of radius sections
$AoA^l$: angle of attack at radius section l
$AoA^l_{max}$: maximum angle of attack at radius section l (e.g., stall angle).

It is also conceivable the other secondary conditions are included in the optimization problem. The observation of load limits may also be directly included, instead of not exceeding a maximum turbulence intensity. In addition, the controller stability may be included.

Alternatively, it is also possible to optimize the operating parameters of all wind turbines simultaneously. For this, the operating parameters may be changed accordingly so slowly that a reaction of the total farm result can be assigned to the respective change.

It is however preferred to optimize the operating settings of one wind turbine after another. This may be called a forward method.

In the forward method, the wind turbine 'i' to be optimized is iterated from the first to the last wind turbine: the sequence is therefore run from the first to the last wind turbine, and in each case the currently optimized wind turbine is designated wind turbine 'i'. When all settings of the first wind turbine have been optimized, it is no longer affected by further changes and the power and wake effect are known. It is therefore removed from the list of wind turbines to be calculated and stored in a second list. The second wind turbine moves up to the first place on the list. The process is repeated until the end of the wind farm is reached. The wind farm is calculated each time only from the wind turbine to be optimized.

The upstream wind turbines are optimized on the basis of the settings of the downstream turbines which may however change later. Therefore, after optimizing the last wind turbine, the list is refilled and the process begins again with the first. This is repeated until the farm power converges, which usually takes place after a few farm run-throughs.

The method is illustrated in FIG. 4.

It has been found that former ideas on sectorial control propose selecting operating modes for an individual wind turbine. When these operating modes are produced, wake effects are not taken into account. In a second step, for each wind turbine and wind direction, an operating mode is selected so that for example the farm power is maximal and the load restrictions are observed. In other words, wake effects are only taken into account as a secondary priority.

In contrast, in the proposed concept, operating modes are proposed which take account of wake effects in the production process and can thus increase the farm yield.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for optimizing an operation of a wind farm, comprising:
performing an optimization sequence using a farm model depicting the wind farm or a part of the wind farm, wherein the wind farm includes a plurality of wind turbines and each wind turbine of the plurality of wind turbines has respective operating settings that are adjustable, performing the optimization sequence including:
specifying, in the farm model, an optimization wind direction for which the operation of the wind farm is to be improved;
varying operating settings of at least a first leading wind turbine of the farm model to improve a total farm result of the farm model;
determining, using a wake model, effects of the varying of the operating settings of the first leading wind turbine on at least one downstream wind turbine of the farm model, the at least one downstream wind turbine being aerodynamically influenced by the first leading wind turbine; and
determining the total farm result of the farm model;
repeating the optimization sequence including:
retaining the optimization wind direction;
varying operating settings of a further leading wind turbine of the farm model;
determining, using a further wake model, effects of varying the operating settings of the further leading wind turbine on a further downstream wind turbine, which is aerodynamically influenced by the further leading wind turbine; and
retaining the operating settings of the first leading wind turbine unchanged;
storing operating settings for each wind turbine that improve the total farm result;
wherein for a respective optimization wind direction:
the plurality of wind turbines of the wind farm are sorted into a processing order;
the optimization sequence is run repeatedly such that for each run, at least one of:
the varying of the operating settings, determining the effects of the varying of the operating settings and determining the total farm result is performed; and
in the varying of the operating settings of each run, the operating settings of a respective wind turbine according to the processing order are varied such that a first wind turbine of the plurality of wind turbines having the operating settings varied in the first run is first in the processing order, and further wind turbines of the plurality of wind turbines, whose operating settings varied in subsequent runs, are subsequent wind turbines of the processing order,
wherein in a total run-through, the optimization sequence is repeated for the plurality of wind turbines until respective operating settings for all leading wind turbines of the wind farm are stored as optimized operating settings, and
wherein the total run-through is repeated one or more times and the respective operating settings stored of a preceding total run are used as starting values in a subsequent run, and
operating all the leading wind turbines using the stored optimized operating settings to generate electrical power from the wind.

2. The method as claimed in claim 1, wherein the total farm result of the farm model is a total farm power of the wind farm, and wherein improving the total farm result of the farm model includes maximizing the total farm power.

3. The method as claimed in claim 1, wherein the further leading wind turbine and the first leading wind turbine are not aerodynamically influenced by one of the further downstream wind turbine and the at least one downstream wind turbine.

4. The method as claimed in claim 1, wherein for the optimization sequence, an optimization wind speed is predefined, and the operating settings that improve the total farm result are stored together with the optimization wind direction and the optimization wind speed.

5. The method as claimed in claim 1, wherein varying the operating settings includes varying one or more of:
a rotation speed of an aerodynamic rotor of at least the first leading wind turbine;
a blade angle of at least one rotor blade of at least the first leading wind turbine; and
an azimuth orientation of a nacelle of at least the first leading wind turbine.

6. The method as claimed in claim 1, wherein operating settings of multiple leading wind turbines are varied at the same time, wherein for each of the multiple leading wind turbines, effects of varying the operating settings of the multiple leading wind turbines on a respective at least one downstream wind turbine, aerodynamically influenced by at least one of the multiple leading wind turbines, are determined by means of the wake model.

7. The method as claimed in claim 1, wherein:
the wake model is used to determine an induced turbulence, the wake model is used to determine a speed deficit, or a total farm power, taking into account a maximum mechanical load of the plurality of wind turbines, is used as the total farm result.

8. The method as claimed in claim 1, wherein the processing order depends on site coordinates of the plurality wind turbines in the wind farm and on the optimization wind direction.

9. The method as claimed in claim 1, wherein in the farm model, for a respective leading wind turbine:
at least one of an azimuth angle, a blade angle or a rotor rotation speed are adjustment values of the respective leading wind turbine;
a wind speed and a turbulence are defined or determined as flow conditions;
a coefficient of thrust acting on the respective leading wind turbine is determined, using a blade element method, depending on the adjustment values and the flow conditions;
an installation power of the respective leading wind turbine is determined, using a blade element method, depending on the adjustment values and the flow conditions; and
an induced turbulence and a speed deficit of a downstream wind turbine are determined depending on the coefficient of thrust and the turbulence of the respective leading wind turbine.

10. The method as claimed in claim 9, wherein:
at least one of an azimuth angle, a blade angle or a rotor rotation speed of the downstream wind turbine are set as adjustment values, depending on: the adjustment values of the downstream wind turbine, the induced turbulence and the speed deficit.

11. The method as claimed in claim 1, wherein the wind farm is a proposed wind farm that has not yet been constructed.

12. A wind farm, comprising:
a plurality of wind turbines, each wind turbine of the plurality of wind turbines having adjustable operating settings, and respective operating settings of the plurality of wind turbines are determined using a method that includes:
performing an optimization sequence using a farm model depicting the wind farm or a part of the wind farm, performing the optimization sequence including:
specifying, in the farm model, an optimization wind direction for which operation of the wind farm is to be improved;
varying operating settings of at least a first leading wind turbine of the farm model to improve a total farm result of the farm model;
determining, using a wake model, effects of the varying of the operating settings of the first leading wind turbine on at least one downstream wind turbine of the farm model, the at least one downstream wind turbine being aerodynamically influenced by the first leading wind turbine; and
determining the total farm result of the farm model;
repeating the optimization sequence including:
retaining the optimization wind direction;
varying operating settings of a further leading wind turbine of the farm model;
determining, using a further wake model, effects of varying the operating settings of the further leading wind turbine on a further downstream wind turbine, which is aerodynamically influenced by the further leading wind turbine; and
retaining the operating settings of the first leading wind turbine unchanged;
storing operating settings for each wind turbine that improve the total farm result;
wherein for a respective optimization wind direction:
the plurality of wind turbines of the wind farm are sorted into a processing order;
the optimization sequence is run repeatedly such that for each run, at least one of:
the varying of the operating settings, determining the effects of the varying of the operating settings and determining the total farm result is performed; and
in the varying of the operating settings of each run, the operating settings of a respective wind turbine according to the processing order are varied such that a first wind turbine of the plurality of wind turbines having the operating settings varied in the first run is first in the processing order, and further wind turbines of the plurality of wind turbines, whose operating settings varied in subsequent runs are subsequent wind turbines of the processing order,
wherein in a total run-through, the optimization sequence is repeated for the plurality of wind turbines until respective operating settings for all leading wind turbines of the wind farm are stored as optimized operating settings, and
wherein the total run-through is repeated one or more times and the respective operating settings stored of a preceding total run are used as starting values in a subsequent run, and
operating all the leading wind turbines using the stored optimized operating settings to generate electrical power from the wind.

* * * * *